US006168085B1

(12) United States Patent
Garcia

(10) Patent No.: US 6,168,085 B1
(45) Date of Patent: Jan. 2, 2001

(54) SYSTEM AND METHOD FOR CASCADE CONTROL OF TEMPERATURE AND HUMIDITY FOR SEMI-CONDUCTOR MANUFACTURING ENVIRONMENTS

(75) Inventor: Kenneth P. Garcia, Salinas, CA (US)

(73) Assignee: Semifab Incorporated, Hollister, CA (US)

( * ) Notice: Under 35 U.S.C. 154(b), the term of this patent shall be extended for 0 days.

(21) Appl. No.: 09/461,151

(22) Filed: Dec. 14, 1999

(51) Int. Cl.$^7$ .................................................. G05P 22/00
(52) U.S. Cl. ..................... 236/44 C; 62/78; 62/176.6; 454/187; 55/385.2
(58) Field of Search ...................... 236/44 A, 44 R, 236/44 B, 44 C; 454/187, 229, 239, 256, 258; 62/176.6, 173, 90, 91, 92, 93, 94, 78; 55/385.2, 282.2; 165/224, 290

(56) References Cited

U.S. PATENT DOCUMENTS

| | | | |
|---|---|---|---|
| 5,431,599 | * | 7/1995 | Genco .................................. 454/187 |
| 5,828,572 | * | 10/1998 | Hasegawa et al. ............. 55/385.2 X |
| 5,890,367 | * | 4/1999 | You et al. ................................ 62/78 |
| 5,912,184 | * | 6/1999 | Young .................................. 454/187 |

OTHER PUBLICATIONS

WATLOW Series 988 User's Manual Excerpt; Dec. 1997; pp. 9.2 through 9.5.

* cited by examiner

Primary Examiner—Harry B. Tanner
(74) Attorney, Agent, or Firm—Fulwider Patton Lee & Utecht, LLP

(57) ABSTRACT

A system and method are provided for controlling temperature and humidity of an environment for a process chamber for semiconductor manufacturing materials. A supply of filtered, temperature and humidity controlled gaseous working fluid is provided to a process chamber, and is controlled by cascade control based upon sensing of environmental parameters to be controlled both upstream and downstream of a chemical filter, which can be a charcoal filter. A controller determines a first control error output by comparing a desired process parameter set point for the controlled environmental parameter of the gaseous working fluid with the first sensed value, determines a second set point from the first control error, and controls the supply of the temperature and humidity controlled gaseous working fluid based upon the second set point.

19 Claims, 2 Drawing Sheets

SYSTEM AND METHOD FOR CASCADE CONTROL OF TEMPERATURE AND HUMIDITY FOR SEMI-CONDUCTOR MANUFACTURING ENVIRONMENTS

BACKGROUND OF THE INVENTION

1. Field of the Invention

This invention relates generally to systems for semiconductor fabrication, and more particularly concerns an improved system for controlling temperature and humidity in semiconductor manufacturing environments.

2. Description of Related Art

Processing of materials such as wafers, cassettes of wafers or substrates used in manufacturing integrated circuits has been conventionally carried out in a carefully temperature and humidity controlled, particulate free environment generally known as a "clean room." Such environments are used to protect contaminant sensitive products such as wafers, masks, ceramic substrates, flat panel displays, and the like during processing. Since particulates, humidity and certain chemicals can contaminate and degrade the surface of semiconductor manufacturing materials, it is important to adequately purge and maintain the local manufacturing environment for such materials free of such contaminants. When photosensitive chemicals are deposited on wafers, some of these chemicals are not only sensitive to the temperature and humidity in the air around them, but they are also highly sensitive to very small amounts (parts per billion) of certain chemicals in the clean room air. Contaminants in the atmosphere can include vaporous amines, halogens, or radicals, such as ammonia, chlorine, bromine, arsine, and silane, for example. Maintenance of such "clean rooms" in a temperature and humidity controlled, contaminant free state can require a great deal of care and effort, particularly during processing of the materials.

As a more easily controlled alternative to "clean rooms," a modular isolation chamber such as a minienvironment can be used to isolate and control the environment surrounding a wafer, cassette of wafers or substrates used in manufacturing integrated circuits, during storage, transport and processing of the materials.

While such systems can control the level of particulates in a minienvironment, temperature and humidity variations can be undesirable. Unfortunately, chemical filters such as a charcoal filter typically used for removing chemical contamination have an exothermic reaction to moisture, adding heat to the filtered air stream circulated through a minienvironment. In the past, temperature and humidity sensors have been placed in the air stream flow path upstream of the chemical filter for feedback control to the environmental control unit (ECU) of the sensed temperature and humidity of the air supplied, prior to filtration of the air stream. However, such a chemical filter induces a relatively long lag time between control of temperature and humidity in the air stream by the environmental control unit (ECU) and the actual conditions in the minienvironment ultimately being controlled, following filtration of the air stream supplied, making viable control at the point of process difficult or impossible to achieve. Essentially, it has been found that energy generated in the chemical filtration process is allowed to accumulate before a response can be detected, causing the environmental system to continually overshoot the temperature set point. The process value may never settle to an acceptable error. Slowing the rate of rise of the desired process temperature value can result in unacceptably slow rates of heating, with the final value taking from hours to days to reach. Apart from the exothermic reactions occurring in such filters, due to the long time cycle and time lag introduced into such systems by such filters, stabilization of temperature and humidity levels of such a minienvironment can take typically from 8 to 48 hours to reach a steady state following startup. Such systems with long lag times between an energy source and a point of process, such as the chemical filtration process for a semiconductor manufacturing environmental control system, typically can not be controlled accurately or efficiently with a single control loop having a single set point for a process parameter. It would be desirable to be able to improve the control of temperature to ±0.1° C. and humidity to ±0.5 percent at the point of process, with carbon filtration or chemical filtration, and to reach this level of control from startup in a much shorter time period.

There thus remains a need for a system and method of controlling temperature and humidity in semiconductor manufacturing environments to consistently condition and maintain desired levels of relative humidity, temperature, and chemical contaminants. The present invention meets these and other needs.

SUMMARY OF THE INVENTION

Briefly, and in general terms, the present invention provides for improved control of temperature and humidity of an environment for a process chamber for semiconductor manufacturing materials. A cascade control approach with first and second control loops is used to allow the output of the first control loop to determine the set point of the second control loop, limiting the energy introduced into the system, allowing an optimal rate of heating, with minimal overshoot, and allowing the control of the process parameters within desired limits to a specified temperature and humidity, typically within 1 to 3 hours.

The present invention accordingly provides for a system for controlling temperature and humidity of an environment for a process chamber for semiconductor manufacturing materials. The system comprises a environmental control unit for providing a supply of temperature and humidity controlled gaseous working fluid to the process chamber through a flow path, a filter disposed in the flow path between the environmental control unit and the process chamber, and a controller operatively connected to the environmental control unit for controlling the output of the environmental control unit. The environmental control unit preferably comprises a heater, a dehumidifier for removing humidity from the gaseous working fluid, and a humidifier to regulate the amount of moisture. In one presently preferred embodiment, the flow path recirculates gaseous working fluid from the chamber to the environmental control unit. In a presently preferred embodiment, the filter comprises a charcoal filter for removing chemicals from the gaseous working fluid.

A first sensor assembly is connected to the controller and to the flow path downstream of the filter for sensing the environmental parameter of the gaseous working fluid, and for sensing a controlled environmental parameter of the gaseous working fluid, and for providing a first sensed value of the controlled environmental parameter to the controller; and a second sensor assembly is connected to the controller and to the flow path upstream of the filter for providing a second sensed value of the controlled environmental parameter to the controller, for monitoring and controlling the parameter of the gaseous working fluid within the process chamber. In a presently preferred embodiment, both temperature and humidity are controlled environmental parameters.

The controller preferably includes means for determining a first control error output by comparing a desired process parameter set point for the controlled environmental parameter of the gaseous working fluid with the first sensed value, means for determining a second set point from the first control error, and means for generating a command output to the environmental control unit for controlling the environmental control unit responsive to the second set point.

The present invention also provides for a method for controlling temperature and humidity of an environment for a process chamber for semiconductor manufacturing materials. The steps of the method comprise providing a supply of temperature and humidity controlled gaseous working fluid to the process chamber through a flow path, providing a chemical filter in the flow path to the process chamber, sensing a controlled environmental parameter of the gaseous working fluid downstream of the filter, and providing a first sensed value of the controlled environmental parameter of the gaseous working fluid, sensing a controlled environmental parameter of the gaseous working fluid in the flow path upstream of the filter, and providing a second sensed value of the controlled environmental parameter of the gaseous working fluid. The step of providing a supply of temperature and humidity controlled gaseous working fluid to the process chamber preferably comprises heating the gaseous working fluid, and may also comprise removing humidity from the gaseous working fluid and then adding a controlled amount of humidity to the gaseous working fluid, and both temperature and humidity are controlled environmental parameters. In one presently preferred embodiment the flow path recirculates gaseous working fluid from the chamber to the environmental control unit.

The method further comprises the step of controlling the output of the environmental control unit based upon the first and second sensed values of the controlled environmental parameter of the gaseous working fluid upstream and downstream of the filter. In a presently preferred embodiment, controlling the output of the environmental control unit is accomplished by determining a first control error output by comparing a desired process parameter set point for the controlled environmental parameter of the gaseous working fluid with the first sensed value, determining a second set point from the first control error, and generating a command output to the environmental control unit for controlling the environmental control unit responsive to the second set point.

These and other aspects and advantages of the invention will become apparent from the following detailed description and the accompanying drawings, which illustrate by way of example the features of the invention.

DETAILED DESCRIPTION OF THE PREFERRED EMBODIMENTS

While chemical contaminants can be filtered from minienvironments for the storage and processing of semiconductor manufacturing materials, this can result in undesirable temperature and humidity variations. Energy generated in the chemical filtration process can accumulate, causing the environmental system to continually overshoot a temperature set point, so that the chemical filtration process for a semiconductor manufacturing environmental control system typically can not be controlled accurately or efficiently with a single control loop having a single set point for a process parameter.

Figure 1:
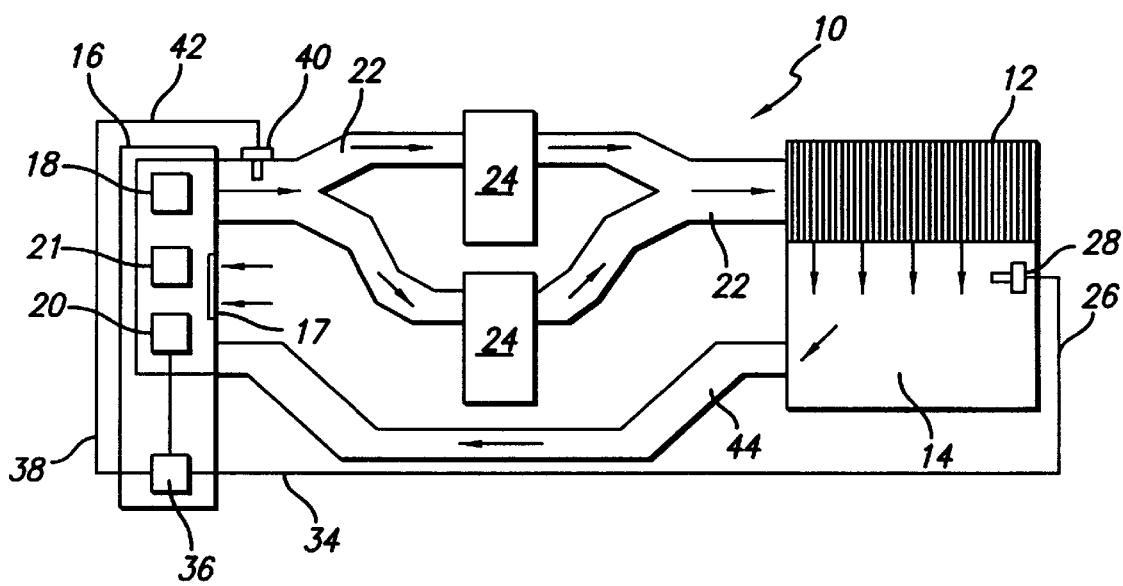
FIG. 1 is a schematic diagram of a first embodiment of a system for controlling temperature and humidity of an environment for a process chamber according to the present invention.

As is illustrated in the drawings, the invention is embodied in a system for controlling temperature and humidity in semiconductor manufacturing environments. Referring to FIG. 1, in a first preferred embodiment, the system 10 is typically provided for controlling temperature and humidity of a minienvironment 12 having a chamber 14 for receiving wafers, cassettes of wafers or substrates used in manufacturing integrated circuits.

The gaseous working fluid being supplied to the minienvironment can be heated and humidified by a minienvironment atmosphere supply unit, or environmental control unit 16, such as the process air control module available under the trade name "RAM" from Semifab, of Hollister, Calif. The environmental control unit typically includes an inlet 17 for air from the ambient atmosphere, a heater 18, a dehumidifier 20 for removing humidity from the gaseous working fluid, and a humidifier 21 for adding controlled amounts of water vapor to the gaseous working fluid.

The gaseous working fluid supplied to the minienvironment flows through a flow path 22 through a filter 24, such as a charcoal filter, or a chemical filter, for example, for removing contaminants produced during conventional manufacturing processes such as vaporous amines, halogens, or radicals, such as ammonia, chlorine, bromine, arsine, and silane, for example, prior to introduction of the gaseous working fluid into the chamber of the minienvironment. In one example of the first embodiment of the invention, the filter was formed by providing two Donaldson filters each rated at 1,260 cfm, providing together for approximately a 2,520 cfm filter rating, and the environmental control unit was configured to supply 2,500 cfm of gaseous working fluid. In this embodiment, a first control loop 26 includes a first sensor box or assembly 28 that is connected in fluid communication with the flow path downstream of the filter for monitoring parameters of the gaseous working fluid within the chamber of the minienvironment to be controlled by the environmental control unit after filtration. The first sensor box typically includes a temperature sensor and a humidity sensor and may also include a sensor monitoring velocity of the gaseous working fluid. The first sensor box generates first output sensor readings that are input via a primary sensor line 34 to a controller 36 of the environmental control unit for controlling the output of the environmental control unit. The controller may be of any suitable type for performing cascade control for controlling the output of the environmental control unit based upon the input from the sensor assemblies, such as controllers commercially available from Anafaze, of Watsonville, Calif., or Watlow, of Winona, Minn.

A second control loop 38 includes a second sensor box or assembly 40 similar to the first sensor box. The second sensor box is disposed upstream of the filter for monitoring parameters of the gaseous working fluid, and generates second output sensor readings that are input to the controller via secondary sensor line 42. In this embodiment, a percentage of the gaseous working fluid is preferably recirculated from the chamber to the environmental control unit via the return flow line 44. Alternatively, particularly where the gaseous working fluid is filtered air, the gaseous working fluid may be vented from the process chamber to the ambient atmosphere.

In the first control loop, the controller determines a first control error output based upon the desired process parameter set points for temperature and humidity, and the sensed values from the first sensor box. The first control error output is used to determine a second set point for the second control loop. Typically the first control loop utilizes a predetermined range of parameter values between a maximum and minimum allowed set point for the control loop. For example, the temperature range is preferably about 18° C. to 25° C., and may be, for example, about 20° to 23° C.

In the second control loop, the second set point is then utilized by the controller to generate a command output to the environmental control unit, such as for adjusting the temperature or humidity of the gaseous fluid being supplied to the minienvironment. In an example of operation of the system of this embodiment, the temperature of filtered air used as the gaseous working fluid was controlled to 21.02±0.016° C., with a standard deviation of 0.004381, and 40.16±0.20 percent relative humidity, with a standard deviation of 0.052144, and these stable parameters were reached within approximately 2.5 hours from startup. These control parameters are significantly better than the desired control of temperature to ±0.1° C. and humidity to ±0.5 percent at the point of process, and the amount of time required for the system to reach a steady state following startup, typically 1 to 3 hours, was significantly improved.

Figure 2:
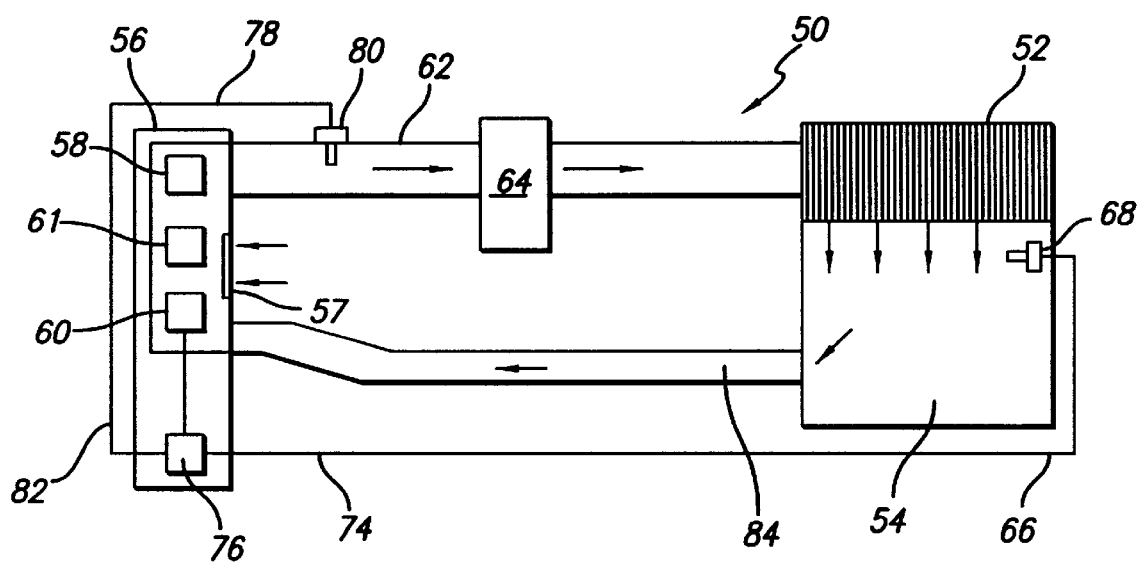
FIG. 2 is a schematic diagram of a second embodiment of a system for controlling temperature and humidity of an environment for a process chamber according to the present invention.

With reference to FIG. 2, in a second preferred embodiment similar to that of FIG. 1, a system 50 is provided for controlling temperature and humidity within a minienvironment 52 by supplying gaseous working fluid to the interior process chamber 54 of the minienvironment. The gaseous working fluid being supplied to the minienvironment can be heated and humidified by a minienvironment atmosphere supply unit or environmental control unit (ECU) 56, such as the process air control module available under the trade name "RAM" from Semifab, of Hollister, California. The environmental control unit typically includes an inlet 57 for air from the ambient atmosphere, a heater 58, a dehumidifier 60 for removing humidity from the gaseous working fluid, and a humidifier 61 for adding controlled amounts of water vapor to the gaseous working fluid.

The gaseous working fluid supplied to the minienvironment flows through a flow path 62 through a filter 64, such as an Extraction Systems filter for removing contaminants produced during conventional manufacturing processes such as vaporous amines, halogens, or radicals, such as ammonia, chlorine, bromine, arsine, and silane, for example, prior to introduction of the gaseous working fluid into the chamber of the minienvironment. The Extraction Systems filter was rated as a 2,500 cfm device, and the environmental control unit was configured as before to supply 2,500 cfm of gaseous working fluid. A first control loop 66 includes a first sensor box or assembly 68 that is connected in fluid communication with the flow path downstream of the filter for monitoring parameters of the gaseous working fluid to be controlled by the environmental control unit after filtration. The first sensor box typically includes a temperature sensor and a humidity sensor, and may also include a sensor monitoring velocity of the gaseous working fluid. The first sensor box generates first output sensor readings that are input via a primary sensor line 74 to an electronic controller 76 of the environmental control unit for controlling the output of the environmental control unit. The controller may be of any suitable type for performing cascade control for controlling the output of the environmental control unit based upon the input from the sensor assemblies, such as controllers commercially available from Anafaze, of Watsonville, Calif., or Watlow, of Winona, Minn.

A second control loop 78 includes a second sensor box or assembly 80 similar to the first sensor box. The second sensor box is disposed upstream of the filter for monitoring parameters of the gaseous working fluid, and generates second output sensor readings that are input to the controller via secondary sensor line 82. In this embodiment, a percentage of the gaseous working fluid is preferably recirculated from the chamber to the environmental control unit via the return flow line 84. Alternatively, the gaseous working fluid may be vented from the process chamber to the ambient atmosphere.

In the first control loop, the controller determines a first control error output by comparing the desired process parameter set points for temperature and humidity with the sensed values from the first sensor box. The first control error output is used to determine a second set point for the second control loop. Typically the first control loop utilizes a predetermined range of parameter values between a maximum and minimum allowed set point for the control loop. For example, the temperature range is preferably about 18° C. to 25° C., as noted above, and may be, for example, about 20° to 23° C.

In the second control loop, the second set point is then utilized by the controller to generate a command output to the environmental control unit, for adjusting the temperature or humidity of the gaseous fluid being supplied to the minienvironment. In an example of operation of the system of this embodiment, temperature of filtered air used as the gaseous working fluid was controlled within approximately 2.5 hours from startup to 21.02±0.017° C., with a standard deviation of 0.004288, and 40.11±0.32 percent relative humidity, with a standard deviation of 0.086703, which are significantly better than the desired control of temperature to ±0.1° C. and humidity to ±0.5 percent at the point of process, and the amount of time required for the system to reach a steady state following startup, typically 1 to 3 hours, was significantly improved.

Figure 3:
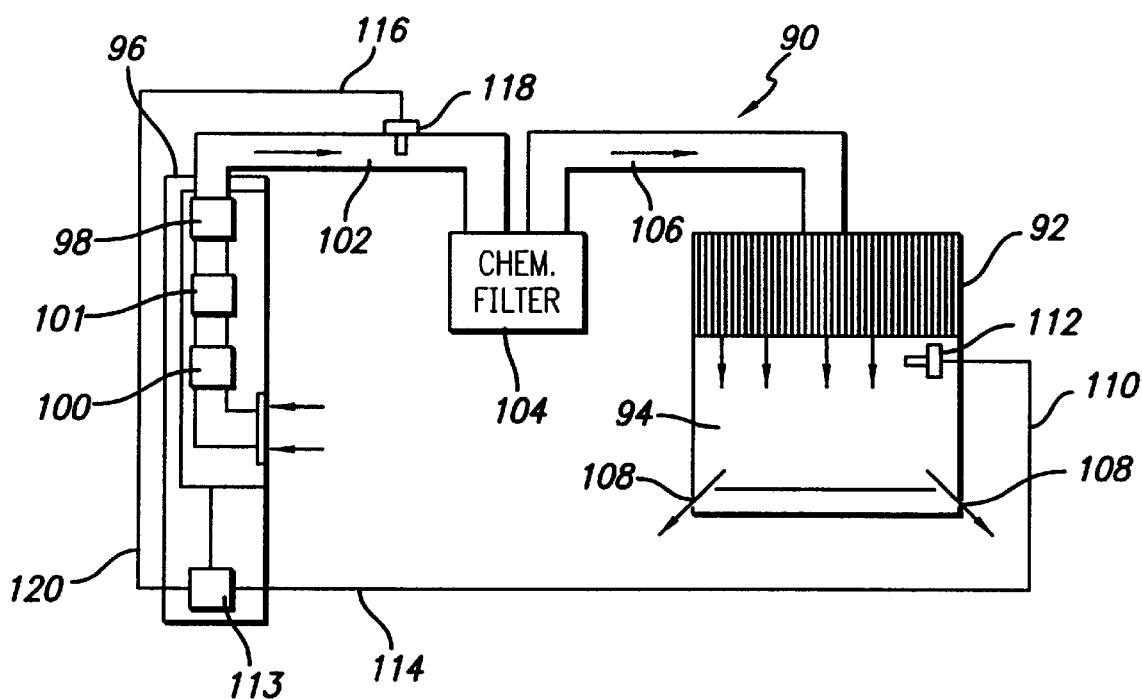
FIG. 3 is a schematic diagram of a second embodiment of a system for controlling temperature and humidity of an environment for a process chamber according to the present invention.

As is illustrated in FIG. 3, in a third embodiment, the system 90 for controlling temperature and humidity within a minienvironment 92 provides gaseous working fluid to the interior process chamber 94 of the minienvironment. The gaseous working fluid supplied to the minienvironment can be heated and humidified by an environmental control unit or ECU 96, such as a process air control module mentioned above. The ECU typically includes a heater 98, a dehumidifier 100 for removing humidity from the gaseous working fluid, and a humidifier 101 for adding controlled amounts of water vapor to the gaseous working fluid. The gaseous working fluid supplied to the minienvironment flows via line 102 to a filter 104, such as a chemical filter, for example, and then via line 106 into the chamber of the minienvironment. When the gaseous working fluid is filtered air, the gaseous working fluid may be vented through vents 108 from the process chamber to the ambient atmosphere. Alternatively, the gaseous working fluid from the process chamber may be recirculated to the ECU.

A first control loop 110 includes first sensor box or assembly 112 disposed downstream of the filter for monitoring parameters of the gaseous working fluid within the chamber of the minienvironment, and that generates outer loop sensor readings that are input to a controller 113 in the ECU via line 114. The first control loop sensor assembly typically includes a temperature sensor and a humidity sensor, but may also include a sensor monitoring velocity of the gaseous working fluid. The controller may be of any suitable type for performing cascade control for controlling the output of the environmental control unit based upon the input from the sensor assemblies, such as controllers commercially available from Anafaze, of Watsonville, Calif., or Watlow, of Winona, Minn.

A second control loop 116 includes a second loop sensor box or assembly 118, similar to the first sensor box, connected to the flow path upstream of the filter for monitoring parameters of the gaseous working fluid to be controlled by the environmental control unit prior to filtration. The second loop sensor generates secondary loop sensor readings that are input via line 120 to the controller, for controlling the output of the gaseous working fluid from the ECU.

In the first control loop, the controller determines a first control error output by comparing the desired process parameter set points, such as for temperature and humidity, with the sensed values from the first loop sensor. The first control error output is used to determine a second set point for the second control loop. Typically the first control loop utilizes a predetermined range of parameter values between a maximum and minimum allowed set point for the control loop.

In the second control loop, the second set point is then utilized by the controller to generate a command output to the ECU, such as for adjusting the temperature or humidity of the gaseous fluid being supplied to the minienvironment.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A system for controlling temperature and humidity of an environment for a process chamber for semiconductor manufacturing materials, the system comprising:
   a environmental control unit for providing a supply of temperature and humidity controlled gaseous working fluid to the process chamber through a flow path;
   a filter disposed in the flow path between the environmental control unit and the process chamber;
   a first sensor assembly connected to the flow path downstream of the filter for sensing the environmental parameter of the gaseous working fluid, said first sensor providing a first sensed value for monitoring parameters of the gaseous working fluid within the process chamber;
   a second sensor assembly connected to the flow path upstream of the filter for sensing a controlled environmental parameter of the gaseous working fluid, said second sensor providing a second sensed value; and
   a controller operatively connected to said first and second sensor assemblies for receiving said first and second sensed values, and operatively connected to the environmental control unit for controlling the output of the environmental control unit responsive to said first and second sensed values.

2. The system of claim 1, wherein said controller comprises means for determining a first control error output by comparing a desired process parameter set point for the controlled environmental parameter of the gaseous working fluid with the first sensed value, means for determining a second set point from the first control error, and means for generating a command output to the environmental control unit for controlling the environmental control unit responsive to the second set point.

3. The system of claim 1, wherein said flow path is connected between said environmental control unit and said process chamber for recirculating gaseous working fluid from the chamber to the environmental control unit.

4. The system of claim 1, wherein said environmental control unit comprises a heater.

5. The system of claim 1, wherein said environmental control unit comprises a dehumidifier for removing humidity from the gaseous working fluid.

6. The system of claim 1, wherein said environmental control unit comprises a humidifier for adding controlled amounts of water vapor to the gaseous working fluid.

7. The system of claim 1, wherein said filter comprises a chemical filter for removing chemical contaminants from the gaseous working fluid.

8. The system of claim 7, wherein said filter comprises a charcoal filter.

9. The system of claim 1, wherein said controlled environmental parameter of the gaseous working fluid is temperature.

10. The system of claim 1, wherein said controlled environmental parameter of the gaseous working fluid is humidity.

11. A method for controlling temperature and humidity of an environment for a process chamber for semiconductor manufacturing materials, the steps of the method comprising:
   providing a supply of temperature and humidity controlled gaseous working fluid to the process chamber through a flow path;
   providing a filter in the flow path between the environmental control unit and the process chamber;
   sensing the controlled environmental parameter of the gaseous working fluid downstream of the filter, and providing a first sensed value of the controlled environmental parameter of the gaseous working fluid;
   sensing a controlled environmental parameter of the gaseous working fluid in the flow path upstream of the filter, and providing a second sensed value of the controlled environmental parameter of the gaseous working fluid; and
   controlling the output of the environmental control unit responsive to the first and second sensed values of the controlled environmental parameter of the gaseous working fluid upstream and downstream of the filter.

12. The method of claim 11, further comprising the step of recirculating gaseous working fluid from the chamber to the environmental control unit.

13. The method of claim 11, wherein said step of providing a supply of temperature and humidity controlled gaseous working fluid comprises heating the gaseous working fluid.

14. The method of claim 11, wherein said step of providing a supply of temperature and humidity controlled gaseous working fluid comprises removing humidity from the gaseous working fluid.

15. The method of claim 11, wherein said filter comprises a chemical filter for removing chemical contaminants from the gaseous working fluid.

16. The method of claim 15, wherein said filter comprises a charcoal filter.

17. The method of claim 11, wherein said controlled environmental parameter of the gaseous working fluid comprises temperature.

18. The method of claim 11, wherein said controlled environmental parameter of the gaseous working fluid comprises humidity.

19. The method of claim 11, wherein said step of controlling the output of the environmental control unit responsive to the first and second sensed values comprises the steps of determining a first control error output by comparing a desired process parameter set point for the controlled environmental parameter of the gaseous working fluid with the first sensed value, determining a second set point from the first control error, and generating a command output to the environmental control unit for controlling the environmental control unit responsive to the second set point.

* * * * *